Sept. 26, 1950 L. A. THOMPSON 2,523,401

LIMITER CIRCUIT

Original Filed April 22, 1944

INVENTOR.
LOUIS A. THOMPSON
BY
J. D. Douglas
His Atty

Patented Sept. 26, 1950 2,523,401

UNITED STATES PATENT OFFICE 2,523,401

LIMITER CIRCUIT

Louis A. Thompson, Rocky River, Ohio, assignor to NEA Service, Inc., Cleveland, Ohio, a corporation of Delaware Original application April 22, 1944, Serial No. 532,252. Divided and this application June 21, 1949, Serial No. 100,490

4 Claims. (Cl. 178—44)

Figures 1, 2:
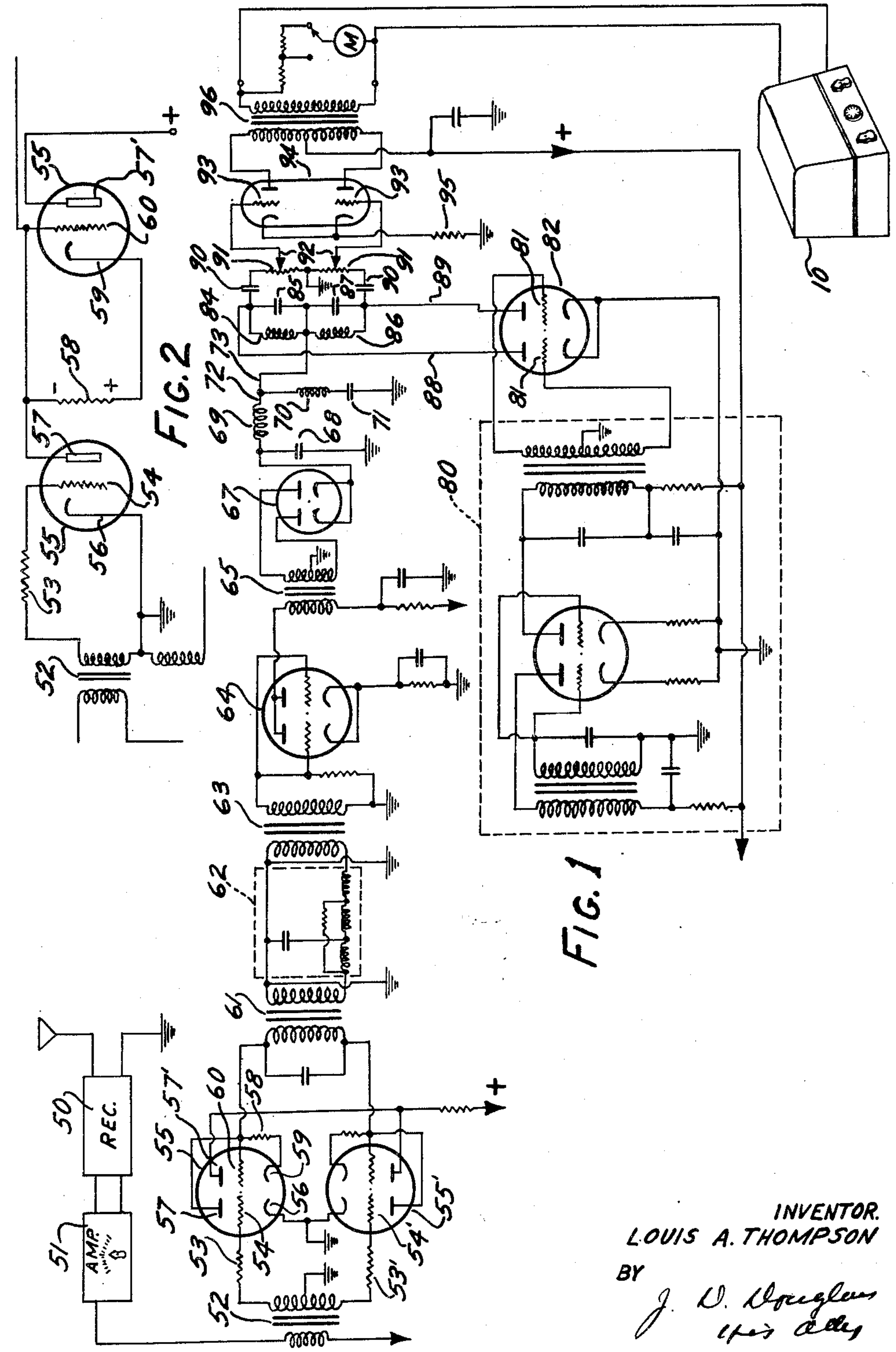

This invention relates to improvements in electrical circuits and more particularly to methods and apparatus that are especially useful in the transmission of intelligence by wire or radio. This application is a division of application Ser. No. 532,252, filed April 22, 1944, now Patent No. 2,488,517, November 15, 1949.

It has become common practice to transmit pictures electrically by means of picture transmitters which are connected to each other by telephone lines or the like. A machine that is designed to transmit pictures efficiently over a telephone line may not easily be adapted to transmit pictures by radio and one adapted for radio transmission may not easily be adapted to transmit over a telephone line or the like.

It is well known that pictures in order to be reproducible with fidelity when transmitted by wire rely to a considerable extent on the perfection of the line connection between the transmitter and the receiver. That is, during transmission, variation in signal, line noises and other disturbances are usually apparent in the final picture, and in some instances have such effect thereon as to make the picture illegible. It is particularly desirable in picture transmission for newspaper reproduction that as good a picture as possible be obtained because other losses occur during the reproduction, which, if coupled with the losses taken during transmission, may make the picture so poor that it cannot be used.

By my present invention I have provided an improved method and apparatus for the transmission and reception of pictures either over the wire or radio whereby the picture is substantially unaffected by line noises, changes in volume and in the case of radio transmission, by static, fading and the like.

In carrying out the invention I contemplate using a standard picture transmitter and a standard picture receiver, and the apparatus about to be described herein comprises an inverter for use during reception. However, it should be borne in mind that the certain parts of the inverter could be built into the receiver to provide a unitary device. Therefore, the invention in its broader aspects contemplates a new method of picture reception; and in its more specific aspects, a means for converting existing machines so that the new method of reception can be effected thereby.

A brief description of the function of the apparatus will assist in an understanding of the apparatus itself hereinafter described specifically.

To begin with, the picture transmitter may be of the character described in my Patent No. 2,284,027 of May 26, 1942. As described in the above patent, it contemplates scanning a picture to provide a signal in the output of the machine which may be an 1800 cycle signal that varies in strength or amplitude in accordance with the reflection of light from the picture. This may also be considered for the purpose of explanation as an 1800 cycle amplitude modulated signal, the amplitude modulations of which carry the intelligence. Ordinarily, this signal is sent from the picture transmitter to the picture receiver over the telephone lines or by means of land line connections. In the receiver the signal is used to reproduce the picture. During the process of transmission, an amplitude modulated signal sometimes accumulates undesirable components due to line noises or increases and decreases in signal strength, all of which affects the desired modulation component and which results in defects in the finished picture.

Therefore, instead of sending the signal out on the lines in the form of an amplitude modulated wave, as it comes from the transmitter, I pass it through a converter as described in my aforementioned co-pending application. In the converter I amplify the signal to a predetermined level. Next the signal is demodulated. Then I utilize the demodulated signal to control a variable frequency oscillator. The variable frequency oscillator and a fixed frequency oscillator are each coupled to a mixer demodulator which detects the difference between the two oscillators and wherein the signal is again demodulated to provide a frequency modulated audio signal. This signal is then amplified and appears in the output of the converter. All of the foregoing is effected in the converter system and the output may now be used to modulate any kind of a transmitter or may be sent by wire if desired without any change. In the case a transmitter is modulated, it may be either a so-called amplitude modulated type transmitter, or it may be a frequency modulated type of transmitter.

The signal after being transmitted by radio is received by any suitable type of receiver, depending on the final type of transmitter used. During the transmission it may be effected in many ways. It may accumulate static, noise and/or fading, all of which under ordinary circumstances might be sufficient to render the ordinary amplitude modulated signal substantially useless for high fidelity reception of picture.

After being received, it is amplified together with the above mentioned undesirable defects and then passes through the inverter. In the inverter it passes through a cascade limiter which very greatly limits the signal, taking off all amplitude modulations. Next, it is reconverted to an amplitude frequency modulated hybrid signal, then rectified and passed through a filter. Then this signal is combined with an 1800 cycle carrier. The signal has now become an 1800 cycle constant frequency, amplitude modulated signal which may be supplied to the standard picture receiver with a result that the picture is substantially the same as it would have been had the facsimile transmitter been directly connected to the facsimile receiver. Thus the signal is handled in such a manner that the usual losses which occur in transmission do not affect it.

It is therefore among the objects of my invention to provide an apparatus whereby a picture signal, such as is received by radio transmission, may be inverted to enable a conventional picture receiver to reproduce the same.

Another object of my invention is to provide an improved method of receiving pictures or intelligence which is substantially unaffected by static, fading or the like.

Another object of my invention is the provision of an improved frequency modulation system and method of operation thereof.

Another object of my invention constitutes the provision of an improved method and apparatus for inverting a signal.

Other objects of the invention are the improvements of circuits embodied in the invention and includes an improved limiter circuit, an improved demodulation circuit and an improved signal reconstruction circuit.

Still other objects of the invention and the invention itself will become more apparent from the following description of a specific embodiment of the apparatus used to receive a signal which apparatus is illustrated by the accompanying drawings and forms a part of this specification.

In the drawings:

Fig. 1 is a schematic drawing of a complete receiving system for receiving and reproducing the signals from the apparatus of my copending application; and Fig. 2 is a simplified view of a portion of the circuit of Fig. 1.

Referring now to the drawings throughout which like parts are designated by like reference characters. The receiving end of the system is best shown in Fig. 1. Here the signals, if the transmission is by radio, are received over a suitable receiver 50. Connected to the receiver 50 is an amplifier 51 in which the signal is raised to a high value. At the output to the receiver the signal may contain certain undesirable components such as noise and static that may have been picked up during transmission, and in addition, the signal may be subject to severe fading. In other respects, however, the signal may be the same as it was when it was used to modulate the transmitter; that is, a frequency modulated signal having a swing between 1000 and 2500 cycles.

Next, the signal is put through what I prefer to term a push-pull cascade limiter circuit. This is effected by feeding the signal into the primary of a push-pull transformer 52, the secondary of which has each opposite ends connected through the resistances 53 and 53' to the grids 54 and 54' of the tubes 55 and 55'.

The signal is built up to a high level to enable the limiter to function even in the presence of deep fading of the signal.

Each limiter tube may include a twin triode and the connections are such that each triode section is connected in cascade. The operation may best be understood by reference to the diagram in Fig. 2 which shows one-half of the push-pull limiter circuit with the twin triode sections separated. Assuming that a fairly strong signal is being received, this signal is amplified to a high level and is applied to the grid 54 of the first triode section of the tube 55 through a series resistance 53. The grid 54 is driven positive on the positive half of the signal which causes grid current to flow in the grid-cathode circuit. This grid current causes an IR drop across the resistor 53 with the result that the signal into the tube is limited.

The anode voltage for the first triode section is supplied by the manner in which the second triode section is connected. The anode 57' of the second triode is connected to the positive plate voltage supply, and normally this tube draws current from the plate circuit to the cathode 59 which is connected through a resistor 58 to the grid 60 of the second section and the anode 57 of the first triode section. The circuit then for the cathode of the second section is through the first triode section to the cathode 56 and thence to ground. The voltage drop across resistor 58 provides bias for the grid 60. Since the cathode 56 of the first section is at ground potential, the plate voltage at 57 is above ground potential due to the current flow in 58.

When the positive signal appears on the grid 54, the plate 57 draws current which is through the resistor 58, thus increasing the negative bias on the grid 60, which action decreases the normal plate current in the second section thus reducing the plate voltage at 57.

This still further increases the limiting action of the circuit. This limiting action is relatively large, depending, of course, on the amplitude of the signal. The final result is that the resultant wave form is devoid of all amplitude modulations caused by static, noise or other amplitude picked up previously in the system and is substantially a square wave. Of course, on the other half of the wave the other limiter tube 55' is operating in a like manner.

The maximum limiting of the signal voltage may be as much as from 2000 to 2. In actual practice, I have found that a desirable method of operation is to raise the signal to a relatively high value before it is limited, thus providing sufficient signal to always provide limiting action. In practice, I have found it desirable for the limiter to start functioning on voltages as low as 2 volts.

As a result of the limiting action, the output from the limiter is substantially a constant voltage of varying frequency.

The output from the two limiter circuits are connected in push-pull to the primary of the transformer 61, the secondary of which feeds into a sloping filter 62. This filter, as the name implies, has a 45 degree sloping characteristic. A signal having a frequency of 1000 cycles, which may be picture white, will pass through the filter without any substantial loss. As the frequency of the signal increases the loss becomes greater, hence a 2500 cycle signal suffers a very substantial loss. Likewise, the signals between 1000 and 2500 cycles suffer a loss substantially in direct proportion to their frequencies. The result is that the signal in the output of the sloping filter 62 comprises a signal that varies in amplitude in a manner corresponding to the original amplitude modulation component. The signal at this point comprises a hybrid signal which consists of frequency and amplitude modulations.

The signal is then fed through the transformer 63, the secondary of which is connected to the amplifier tube 64 which may be another twin triode with the two sections connected in parallel, and in which the signal is amplified.

The output from the tube 64 is connected to the transformer 65, the secondary of which is connected to the anodes of the demodulator tube 67. This tube rectifies both halves of the signal which then appears on the cathodes of the tube which are connected together, and is a pulsating direct current, the amplitude of which varies according to the modulation envelope. The pulsations in the signal are removed in the filter comprising the input condenser 68, the choke 69 and followed by the series choke and condenser 70—71 connected between the conductor 72 and ground. Thus at 73, there remains only a signal which corresponds exactly to the modulation envelope of the original signal.

The next step in the procedure is to use this signal energy to reconstruct an 1800 cycle amplitude modulated signal in order that it may be supplied to a conventional facsimile receiver and there used to reproduce the picture.

For generating the 1800 cycle carrier signal, I provide an 1800 cycle audio oscillator 80 which may be of any standard type giving a good sine wave and having a constant frequency output of 1800 cycles. The output from the oscillator is connected in push-pull to the grids 81 of the tube 82, which may be a twin triode. The anode voltage for this tube is obtained from the signal (at 73) after it leaves the filter, the signal being supplied to the anodes through resonant filters, each of which comprises an inductance 84 and 86 paralleled by capacities 85 and 87 respectively. The two inductances are connected end to end and, as stated, each has a condenser across it. The signal is fed to the junction of the inductances and capacities. The leads 88 and 89 connect to the anodes of the tube 82. The two resonant filters 84—85 and 86—87 are tuned to the frequency of the oscillator 80. Tube 82, which may be termed a restorer tube, only operates to pass a signal when plate voltage is supplied to the anodes. Because the plate voltages on this tube are being supplied by the signal which is substantially a replica of the original signal used to modulate the carrier at the facsimile transmitter, the signal in the plate circuit of the tube varies with the plate voltage. The signal as it appears across the parallel resonant circuits is an 1800 cycle amplitude modulated carrier which is supplied through the coupling condensers 90 to the potentiometers 91 which are connected in series and grounded at their junction. The sliders 92 of the potentiometers are connected to the control grids 93 of the twin triode tube 94 which operates in push-pull. The cathodes of the tube are grounded through the resistor 95. The plate circuit of the tube is connected to the output transformer 96. The tube 94 amplifies the signal which is thus supplied to the transformer 96. The level of the signal may be determined by a meter M indicator disposed in the output. The output from the inverter may be connected directly to a standard picture receiver 10 for reproduction or it may be sent over land wires to the place where the picture receiver is located.

It should particularly be noted that the filter network ahead of the point 73 and comprising the inductance 69 and capacity 68, and the inductance 70 and capacity 71 are effective to prevent anything but the DC component of the desired signal from getting through to the point 73, and that the resonant circuits 84—85 and 86—87 are resonant to 1800 and therefore present a high impedance to the 1800 cycle carrier and therefore readily transfer the 1800 frequency through the coupling condensers 90 to the input circuit of the tube 93. However, these resonant circuits readily admit the DC energy from 73 to the anodes of tube 82.

Thus the signal in the restorer circuit is a clean cut signal without any spurious modulations due to the undesirable elements in the incoming signal.

The two taps shown for the output meter provides means whereby when a greater resistance is in series, the gain can be raised and the proper level determined for sending the picture by land wire. If the picture is fed directly to the picture receiver, the gain may be lowered and the proper level determined by shifting the meter to the tap where the lesser resistance is in the circuit. In either case the meter enables the proper output to be determined.

Having thus described my invention, I am aware that numerous and extensive departures may be made therefrom without departing from the spirit or scope of the invention.

I claim:

1. A limiter circuit comprising a signal input circuit having an electron tube including a grid, a cathode and an anode, a coupling resistor coupling said circuit to the grid of said tube, a second electron tube including a cathode, grid and anode arranged to normally draw current and said first tube being directly connected to the second tube and the anode voltage for the first tube being supplied by the second tube; said input circuit of the first tube adapted, upon a signal being impressed thereon, to transfer said signal through said coupling resistance to the first tube and to drive said grid positive and said resistance upon the grid being driven positive and drawing current to cause a voltage drop thereacross and effective to reduce the signal on the grid, and said anode of the first tube converting the positive signal to a negative signal to drive said grid of said second tube negative to reduce the plate current in the second tube and hence reduce the plate voltage of the first tube to severely limit said signal.

2. A limiter circuit comprising a signal input circuit having an electron tube including a grid, a cathode and an anode, a coupling resistor coupling said circuit to the grid of said tube, a second electron tube including a cathode, grid and anode arranged to normally draw supply current and said first tube being coupled to the second tube and the anode voltage for the first tube being supplied by the second tube; said input circuit of the first tube adapted, upon a signal being impressed thereon, to transfer said signal through the said coupling resistor to the first tube to drive said grid positive, said resistance, upon the grid being driven positive, drawing grid current to cause a voltage drop thereacross and effective to reduce the signal on the grid, said anode of the first tube converting the positive signal to a negative bias to bias said grid of said second tube negative to reduce the plate current in the second tube and hence reduce the plate voltage of the first tube to severely limit said signals.

3. A limiter circuit including a signal input circuit comprising an electron tube having a grid, a cathode and an anode, a coupling resistor disposed in the grid circuit of said tube, a second electron tube having a cathode, grid and anode arranged to normally draw current, said first tube being connected to the second tube, the anode voltage for the first tube being supplied by the second tube; said input circuit of the first tube adapted upon a signal being impressed thereon to pass said signal through the grid resistance of the first tube and to drive said grid positive and said resistance, upon grid being driven positive, causing a voltage drop thereacross to reduce the signal on the grid, and said anode circuit of the first tube converting the positive signal to a negative voltage to negatively bias the grid of said second tube and to reduce the plate current therein and reduce the plate voltage of the first tube to severely limit said signals.

4. A limiter circuit comprising a signal input circuit having an electron tube including a grid, a cathode and an anode, a coupling resistor coupling said circuit to the grid of said tube, a second electron tube including a grid, a cathode and anode arranged to normally draw supply current and said first tube being coupled to the second tube and the anode voltage for the first tube being supplied by the second tube; said input circuit of the first tube adapted upon a signal being impressed thereon to transfer said signal through said coupling resistor to the first tube to drive said grid positive and said resistor, upon the grid being driven positive and drawing said current, to cause a voltage drop thereacross and effective to reduce the signal on the grid, said anode of the first tube converting the positive signal to a negative bias to drive said grid of said second tube negative to reduce the plate current in the second tube and hence reduce the plate voltage of the first tube to severely limit said signals.

LOUIS A. THOMPSON.

No references cited.